United States Patent [19]
Boydstun, IV et al.

[11] Patent Number: 5,746,554
[45] Date of Patent: May 5, 1998

[54] TIE-DOWN METHOD FOR VEHICLE TRANSPORTER

[75] Inventors: Robert D. Boydstun, IV, Clackamas; John T. Huey, Milwaukie, both of Oreg.

[73] Assignee: Boydstun Metal Works Inc., Portland, Oreg.

[21] Appl. No.: 658,497

[22] Filed: Jun. 5, 1996

[51] Int. Cl.$^6$ .................................................. B60D 7/08
[52] U.S. Cl. .............................. 410/12; 410/7; 410/10; 410/19; 410/23
[58] Field of Search ...................... 410/4, 7–12, 19, 410/21–23, 103; 248/499

[56] References Cited

U.S. PATENT DOCUMENTS

| | | |
|---|---|---|
| 2,492,829 | 12/1949 | Baker . |
| 3,595,598 | 7/1971 | Nuzum ............................. 410/23 |
| 3,613,919 | 10/1971 | Ceepo ........................... 410/7 X |
| 3,650,416 | 3/1972 | Bodenheimer . |
| 3,841,235 | 10/1974 | Wheeler et al. ............. 410/12 |
| 3,931,895 | 1/1976 | Grimaldo . |
| 4,068,813 | 1/1978 | Chatwin et al. ............... 410/7 |
| 4,147,113 | 4/1979 | Kilgur et al. .................. 410/8 |
| 4,316,686 | 2/1982 | Cottrell et al. ............... 410/12 |
| 4,668,141 | 5/1987 | Petersen ....................... 410/12 |
| 4,668,142 | 5/1987 | Fity et al. .................... 410/26 |
| 4,789,281 | 12/1988 | Westerdale ................. 410/29.1 |
| 4,993,898 | 2/1991 | Klahold ....................... 410/12 |
| 5,071,298 | 12/1991 | Conzett ....................... 410/27 |
| 5,286,149 | 2/1994 | Seay et al. .................. 410/26 |

FOREIGN PATENT DOCUMENTS 61-175134  8/1986  Japan ........................... 410/12

OTHER PUBLICATIONS

Photographs of Japanese tie-down systems for vehicle transporters (1994), 20 pages.

*Primary Examiner*—Stephen Gordon
*Attorney, Agent, or Firm*—Chernoff, Vilhauer, McClung & Stenzel

[57] ABSTRACT

A tie-down method for securing a vehicle to a longitudinally-extending elongate vehicle transporter utilizes a vehicle support assembly and at least four securement devices associated with the vehicle support assembly and attachable to the vehicle. A respective tension member portion is interconnected with a respective one of each of the four securement devices. Each tension member portion is capable of exerting a pull-down force on a respective one of the securement devices. A tension-applying mechanism is interconnected with each tension member portion to adjust the pull-down force on each of the securement devices. A tension-equalizing mechanism is interconnected with each tension member portion and is capable of automatically substantially equally distributing tension applied by the tension-applying mechanism among each tension member portion, to substantially equalize the pull-down force automatically with respect to the four securement devices. A tension-limiting mechanism is interconnected with the tension-applying mechanism and is capable automatically of limiting the pull-down force exerted by the tension member to a predetermined amount.

18 Claims, 6 Drawing Sheets

TIE-DOWN METHOD FOR VEHICLE TRANSPORTER

BACKGROUND OF THE INVENTION

The present invention relates to vehicle transporters, such as trucks, trailers, railcars and the like, which have a tie-down apparatus for securing a vehicle to the vehicle transporter.

Vehicle transporters, such as truck/trailer combinations, are capable of elevating and orienting numerous automobiles in tightly stacked configurations on one or more vehicle support assemblies. Traditionally, vehicles have been secured to vehicle transporters using chains or cables. Often these devices include a four point chain system for securing the four corners of the vehicle. One or more ratcheting devices are actuated to place the chains in tension so as to restrain the automobile from movement during transit. The vehicles must be secured longitudinally so that the vehicles will not roll off the vehicle support assembly in response to acceleration or braking of the vehicle transporter. It is also advantageous to pull down on the vehicles to lower the height of the vehicles, so that additional vehicles may be stacked on the vehicle transporter. It is also important to be able to quickly secure the vehicles to the vehicle transporter.

One prior art system includes four separate chains, each of which is connected to a separate winch which must be manually tightened. Each chain may be attached to the vehicle using a hook. Each chain may be engaged with one of several longitudinally spaced rollers which are mounted on the vehicle support assembly, thus allowing the positions of the chains to be longitudinally adjusted so as to pull down at opposing longitudinal inclinations to longitudinally stabilize the vehicle.

However, there are several drawbacks with this tie-down system. Vehicles are often damaged during the tie-down because of several operator controlled factors. First, operators over tighten the chains, applying too much tension for the vehicle to accommodate. Second, operators do not uniformly adjust the tension in the four chains. The difference in tension between the different securement points on the vehicle can lead to buckling or warping of the body of the automobile, or breakage of the securement points. Vehicle manufacturers must therefore build heavier vehicles to accommodate the excess and differential strain that may be imposed by such a tie-down system. In addition, because the four winches are located near the four corners of the vehicle, the operator must walk around the vehicle transporter to adjust the winches. Large trailers may be seventy feet or more in length, and operators who secure vehicles to such trailers often do not readjust winches because to do so would mean many time-consuming trips around the vehicle transporter. If cables rather than chains are used, the winches used to tighten the cables also pose other problems. Cables can become worn, deformed or damaged when repeatedly wound around the winches used to tighten the cables.

Nuzmun U.S. Pat. No. 3,595,598 discloses a trailer with unitary tie-down control. The trailer has two control cables, each with hooks for securing to a vehicle. The control cables are threaded through a loop member which is connected to a winch for tightening the control cables. Each cable attaches to a front and rear end of the vehicle. The winch provides for simultaneous tensioning of the control cables. However, the tie down apparatus provides uniform tensioning only between the ends of a single cable, and not between both control cables, and therefore does not provide uniform tensioning automatically at all four securement points. In addition, this tie-down system does not provide for longitudinal adjustability of the positions of the cable ends, and thus does not enable longitudinally opposed, angled pull-downs on the hooks for longitudinal stability of vehicles regardless of their length. It also does not limit the amount of force that may be exerted by the cables on the vehicle.

In another prior art system, the vehicle is secured to the vehicle transporter using two cables. The cables are attached to either opposite sides or opposite ends of the vehicle. At one end of the vehicle, the cable is secured at two points to the vehicle support assembly and secured to the vehicle at a point in between those two points, so that the cable provides a resultant straight pull-down force to the vehicle at that end. Because this tie-down apparatus results in a straight pull-down being exerted at one end of the vehicle, it is necessary to use chocking blocks to secure the vehicle longitudinally. This system also does not achieve uniform pull-down force automatically at all four securement points on the vehicle, and does not limit the amount of pull-down force.

What is therefore desired is a tie-down system for a vehicle transporter that automatically equalizes the pull-down forces at all four points of securement of the vehicle, that allows the tension in the cables securing the vehicle to be adjusted simultaneously from one side of the vehicle transporter, that limits to a predetermined amount the pull-down force which may be applied to secure a vehicle, which does not cause deformation or wear of the cable due to repeated windings around a winch, and which does not require additional devices to longitudinally secure a vehicle regardless of its length.

SUMMARY OF THE INVENTION

The present invention overcomes the aforementioned drawbacks of the prior art by providing an improved tie-down method to secure a vehicle to a longitudinally extending elongate vehicle transporter. A first aspect of the present invention comprises a method which utilizes a vehicle support assembly, with at least four securement devices associated with the vehicle support assembly and attachable to the vehicle. A respective tension member portion is interconnected with a respective one of each of the four securement devices. Each tension member portion is capable of exerting a pull-down force on a respective one of the securement devices. A tension-applying mechanism is interconnected with each tension member portion to adjust the pull-down force on each of the securement devices. A tension-equalizing mechanism is interconnected with each tension member portion and is capable of automatically substantially equally distributing tension applied by the tension-applying mechanism among each tension member portion, to substantially equalize the pull-down force automatically with respect to the four securement devices.

Preferably, the securement devices are both longitudinally-spaced and transversely-spaced with respect to each other, and the tension-equalizing mechanism interconnects respective transversely-spaced ones of the securement devices in tension while also interconnecting respective longitudinally-spaced ones of the securement devices in tension. In a preferred embodiment, the tension-equalizing mechanism interconnects respective longitudinally-spaced ones of the securement devices in tension independently of any interconnection thereof through the vehicle. In the alternative, the tension-equalizing mechanism interconnects respective longitudinally-spaced ones of the securement devices in tension through the vehicle.

This first aspect of the present invention has several advantages over the prior art. The uniform tension prevents warping or buckling of the vehicle body, and breakage of the securement points on the vehicle, caused by different pull-down forces exerted by the various tension member portions. It is also not necessary for the operator to adjust several tension-applying mechanisms to obtain uniform tension, and therefore the operator need not travel around the vehicle transporter to adjust each tension member portion. Because the tension-applying mechanism is interconnected to all four securement devices, the vehicle may be secured quickly to the vehicle support assembly.

A second aspect of the invention comprises a method which utilizes a vehicle support assembly, and a securement device associated with the vehicle support assembly and attachable to the vehicle. A tension member is interconnected with the securement device. The tension member is capable of exerting a pull-down force on the securement device. The tension-applying mechanism is interconnected with the tension member to adjust the pull-down force. A tension-limiting mechanism is interconnected with the tension-applying mechanism and is capable automatically of limiting the pull-down force exerted by the tension member to a predetermined amount.

This second aspect of the invention has the advantage that it limits the amount of pull-down force that may be exerted by the tension members. This also prevents damage to the body of the vehicle due to excessive pull-down force, and allows manufacturers to build lighter weight vehicles that do not need to withstand over tightening of a tension member.

A third aspect of the invention comprises a method which utilizes a vehicle support assembly with at least four securement devices associated with the vehicle support assembly and attachable to the vehicle. A respective tension member portion interconnects with a respective one of each of the four securement devices. Each tension member portion is capable of exerting a pull-down force on a respective one of the securement devices. A tension-applying mechanism interconnects with each tension member portion to adjust the pull-down force on each of the securement devices. Each tension member portion is capable of exerting the pull-down force through at least two side-by-side parts of each tension member portion.

This third aspect of the present invention provides for a greater mechanical advantage in applying the pull-down force to the securement device. Because the tension member exerts a pull-down force through two side-by-side parts, not as much tension is required to be applied to the tension member to achieve the necessary pull-down force required to secure the vehicle.

A fourth aspect of the invention comprises a method for securing a vehicle to a longitudinally-extending vehicle support assembly having transversely-spaced opposite sides. At least a respective pair of longitudinally-spaced securement devices are attached to the vehicle adjacent each of the sides. A respective tension member portion is interconnected with each of the securement devices. Each tension member portion is capable of exerting a respective pull-down force on a respective one of the securement devices. A tension-applying mechanism is interconnected with each tension member portion, capable of automatically simultaneously distributing tension applied by the tension-applying mechanism among each tension member portion. At least one tension member portion is engaged with the vehicle support assembly adjacent each of the sides at a selected one of different longitudinally spaced positions, and exerting a resultant pull-down force on each of the securement devices, so that each resultant pull-down force exerted on a respective one of the pair of longitudinally spaced securement devices has a longitudinal inclination opposing the resultant pull-down force exerted on another of the pair of longitudinally spaced securement devices. Each respective pull-down force on each of the securement devices is simultaneously adjusted to secure the vehicle to the vehicle support assembly.

The fourth aspect of the invention provides for a method of securing a vehicle longitudinally with respect to the vehicle support assembly by means of a tie-down system regardless of the vehicle's length. Thus it is not necessary to use chocking blocks or other devices to longitudinally secure the vehicle.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
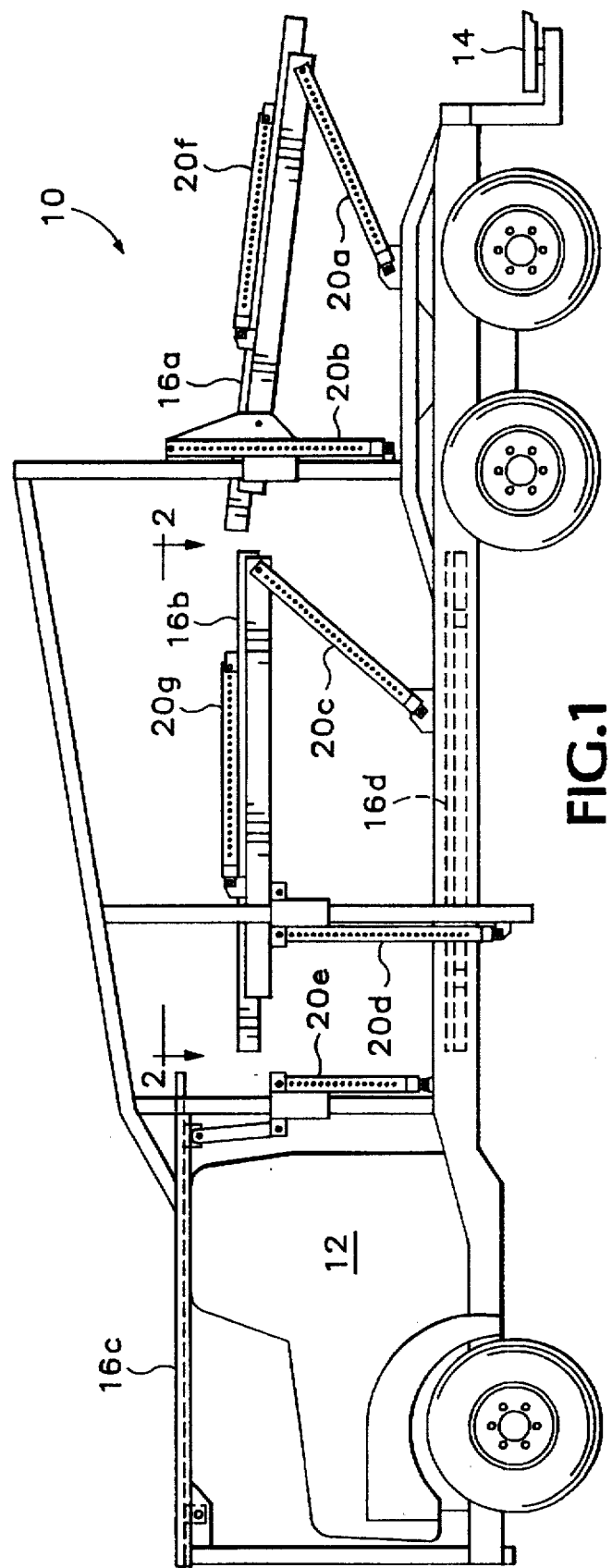
FIG. 1 is a simplified side view of an exemplary embodiment of a vehicle transporter in accordance with the present invention, with certain elements deleted for clarity.

An exemplary vehicle transporter incorporating the present invention, indicated generally as 10 in the simplified side view of FIG. 1, comprises an automobile-carrying truck unit 12 and an automobile-carrying trailer 14 (only the articulated hitch of the trailer being shown). Both the truck and trailer have comparable vehicle-support assemblies such as 16a, 16b, 16c and 16d, and comparable telescopically extensible and retractable fluid power cylinder assemblies such as 20a, 20b, 20c, 20d, 20e, 20f, and 20g for selectively moving the upper vehicle support assemblies to different adjustable positions at different elevations. The truck unit 12 is preferably capable of transporting four or five vehicles depending upon their sizes, and the trailer 14 is preferably equipped with a larger number of vehicle support members capable of transporting a larger number of vehicles.

The present invention can also be incorporated into many alternative configurations of vehicle transporters, having diverse other arrangements of vehicle support members as shown, for example, in U.S. Pat. Nos. 2,492,829, 3,650,416, 3,931,895, 4,668,141, 4,668,142, 4,789,281, 5,071,298, and 5,286,149, all of which are incorporated herein by reference. Any alternative configuration capable of being modified advantageously to incorporate the principles of the present invention, as so modified, is intended to be within the scope of the present invention.

Figure 2:
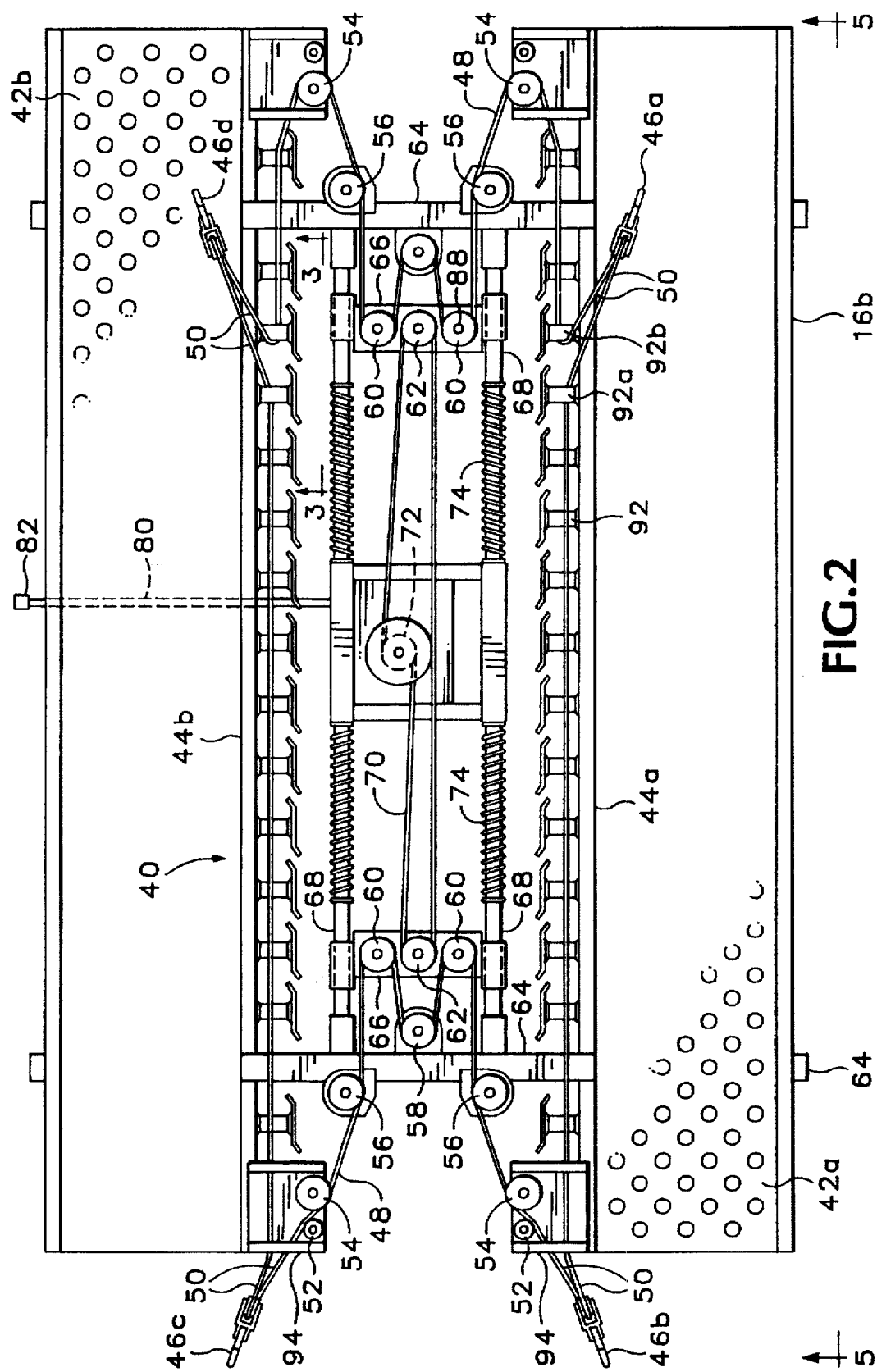
FIG. 2 is a top view of an exemplary tie-down apparatus, taken along line 2—2 of FIG. 1.

FIG. 2 shows a top view of an upper vehicle support assembly 16b and a tie-down apparatus 40. The vehicle support assembly 16b has two wheel-supporting ramps 42a and 42b and transversely-spaced opposite sides 44a and 44b. The transported vehicles are usually loaded onto the vehicle support assembly by driving the vehicles onto the ramps.

Figure 3:
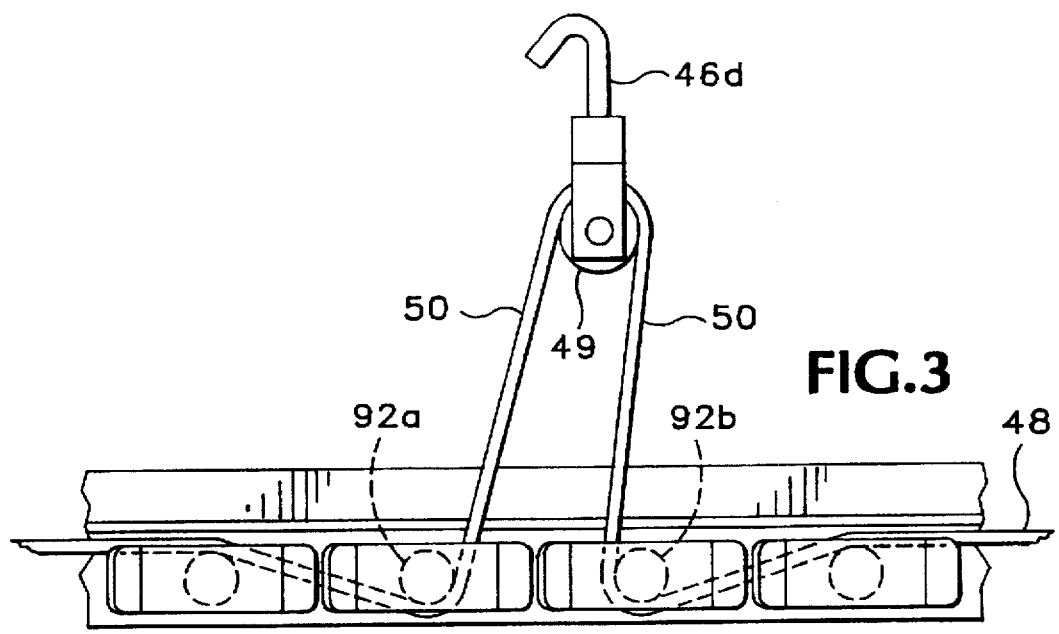
FIG. 3 is a detail view taken along line 3—3 of FIG. 2.

Four securement devices 46a, 46b, 46c and 46d are associated with the vehicle support assembly and attachable to a vehicle. FIG. 3 shows a side view of an exemplary securement device 46d. Manufacturers of various types of vehicles provide specifications for the particular type of securement devices that should be used and where such securement devices should be attached. The manufacturers of the vehicles typically provide holes or loops on the body of the vehicle for attachment of the securement devices. This allows for securement of the vehicles independently of securement of the wheels of the vehicle.

Returning to FIG. 2, the securement devices are preferably attached to the body of the vehicle with one securement device attached adjacent each of the four corners of the vehicle. FIG. 2 shows four securement devices arranged for attachment in such a fashion, with securement devices longitudinally-spaced and transversely-spaced.

A single continuous tension member 48 is interconnected with each of the four securement devices. Each securement device has a pulley 49 that engages the tension member 48, as is illustrated in side view in FIG. 3. Each securement device is thus movably engageable with respect to the tension member. In tie-down apparatus 40 the tension member is a ¼ inch diameter cable made of extra improved plow steel. This type of cable does not become deformed or bent upon being tightly wrapped about pulleys or rollers of sufficient diameter. Nevertheless, the cable preferably should not be wrapped about pulleys less than 3 inches in diameter. Other tension members could be used, such as chains or cables of different diameters.

Respective tension member portions are attached to each securement device for exerting a pull-down force, each including at least two side-by-side cable parts 50. Thus, the resultant pull-down force exerted on the securement device is twice the tension in the tension member 48. It is preferred that the resultant pull-down force exerted at each securement device be about 1000 pounds, requiring a tension in the cable 48 of about 500 pounds. However, the amount of tension to be applied will depend upon the size and weight of the vehicle being secured.

Figure 5:
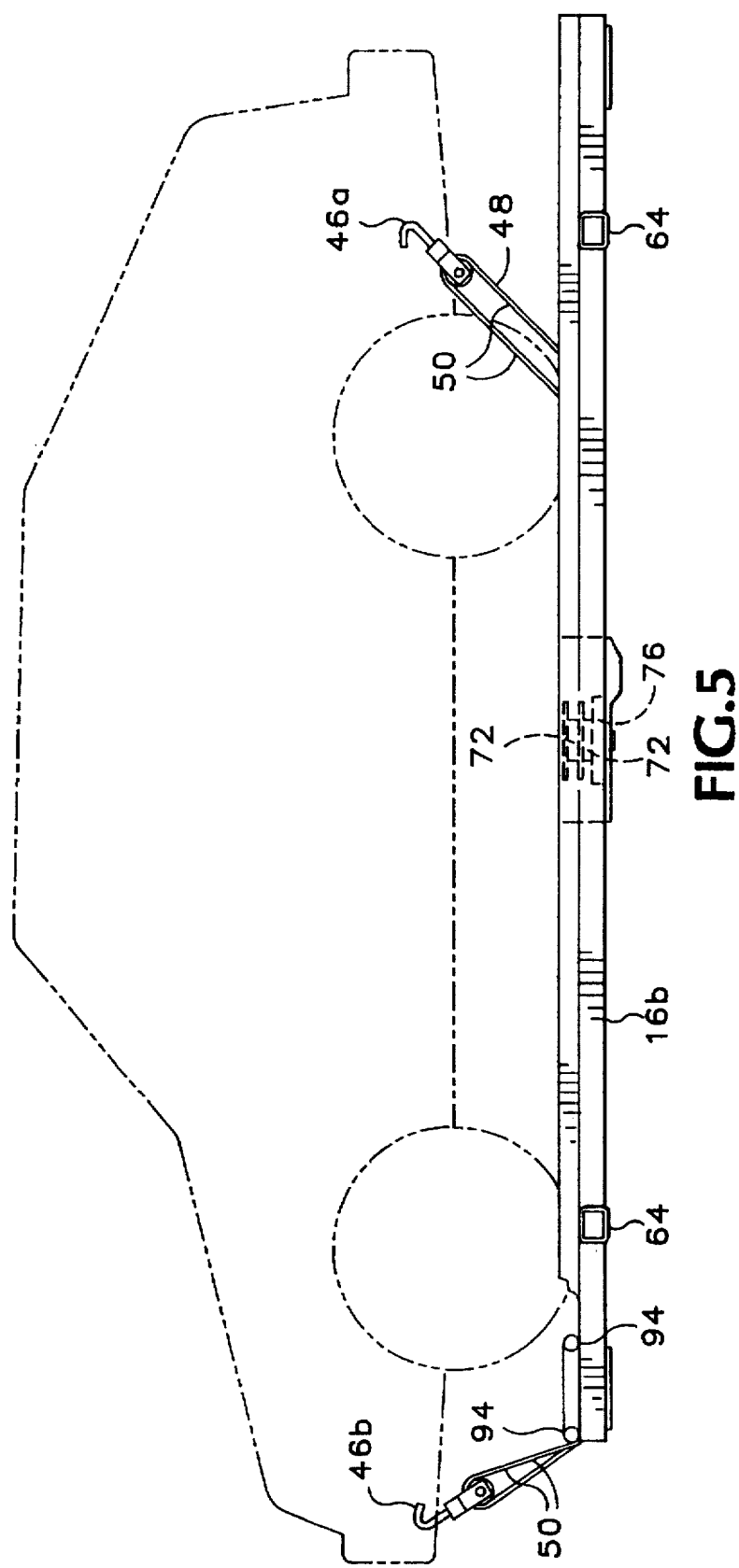
FIG. 5 is a side view taken along line 5—5 of FIG. 2.

FIG. 2 shows the tension member 48 between securement devices 46b and 46c engaging pulleys 52, 54, 56, 58, and 60. All such pulleys except 60 are fixedly mounted to the vehicle support assembly. Pulleys 60 are mounted to movable carriages 66. The movable carriages 66 are slidably mounted on two parallel rods 68 fixed to cross-members 64 of the vehicle support assembly. A middle pulley 62 is mounted to each carriage. A cable 70 engages the middle pulleys 62 and connects to respective upper and lower winding hubs 72 which are interconnected to rotate in unison. FIG. 5 shows the two hubs 72 in a side view. Returning to FIG. 2, one end of the cable 70 is connected to one of the hubs 72, and the other end of the cable 70 is connected to the other hub 72 so that as the hubs 72 rotate, the ends of the cable 70 are simultaneously wrapped about each hub or unwrapped, depending on the direction of rotation of the hubs.

In operation, the hubs 72, cable 70, carriages 66, middle pulley 62 and pulleys 52, 54, 56, 58 and 60 function as a tension-applying mechanism interconnected with each tension member portion to adjust the pull-down force on each of the securement devices. When the hubs 72 are rotated so that each end of the cable 70 is simultaneously wrapped about the hubs 72, the cable 70 therefore pulls on the middle pulleys 62 causing both movable carriages 66 to move toward the hubs 72 along the rods 68. The pulleys 60, likewise attached to the carriages 66, accordingly pull the tension member 48, thus adjusting the tension in the tension member 48 and the pull-down force exerted by the tension member 48 on the securement devices 46a, b, c and d.

Each rod 68 has respective coiled springs 74 around the rod 68 located between the hub 72 and a respective carriage 66. In operation, when the vehicle is being secured, the movable carriages 66 are pulled inward against the springs 74. The springs provide a resistive force so that the carriages 66 will be pulled in equally and simultaneously. This enables the carriages 66 automatically to take up unequal slack that may be in the tension member on one side of the tie-down apparatus. The springs 74 also aid in the loosening of the tension member 48, as the springs 74 push the carriages 66 away from the hubs 72 as the hubs rotate to unwrap the cable 70.

Figure 4:
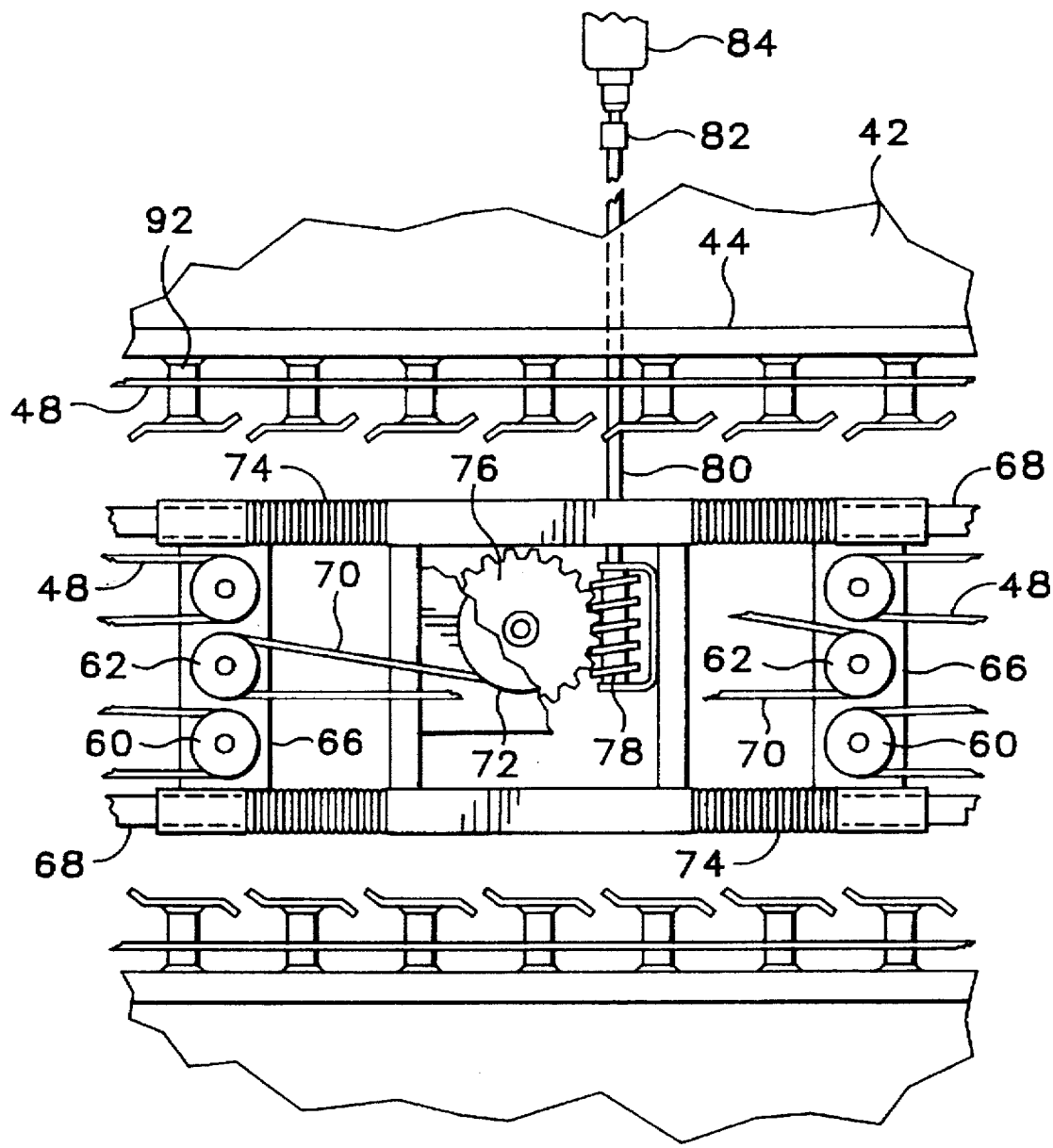
FIG. 4 is a top detail view of a central portion of FIG. 2 in a tightened condition.

Referring to FIG. 4, a gear 76 is connected to and rotates with the hubs 72. The gear 76 is engaged with a worm gear 78. The ratio of the worm gear 78 rotation to the gear 76 rotation is 60:1. This ratio is such that the worm gear 78 functions as an automatic lock for the hubs 72, preventing the hubs 72 from rotating and thus loosening the tension applied to the tension member 48, unless the hubs 72 are rotated by the worm gear 78.

The worm gear 78 is connected to a shaft 80 which has a fitting 82 welded to the end. The fitting 82 is matingly engageable with an air wrench 84. In tie-down apparatus 40, the air wrench 84 includes a conventional integral torque limiter. The torque limiter can be adjustably preset to prevent the air wrench from applying more than a predetermined amount of torque to the shaft 80. This operates as a tension-limiting mechanism capable of automatically limiting each pull-down force, exerted by each respective tension member portion, to a predetermined amount of force. Alternatively, a conventional torque-limiting clutch could be inserted into the drive mechanism for the hubs 72 to perform a comparable function.

Other alternatives could be used to apply tension to the tension members. For example, the carriages could be mounted on oppositely threaded rods which rotate to move the carriages toward or away from each other. The carriages could be moved using other arrangements of cables and hubs, for example using a single hub connected with each carriage. Hydraulic or pneumatic systems could also be used to move the carriages. Other alternatives could apply tension directly to the tension member 48, for example by connecting the tension member to a rotating hub, to a moving set of pulleys, to a winch, or some other device used for tightening.

Referring to FIG. 2, once tension has been applied to the tension member 48, the tension member portions 50 transfer tension to the securement devices. The carriages 66 and pulleys 52, 54, 56, 58 and 60 operate as a tension-equalizing mechanism, capable of automatically substantially equally distributing tension applied by the tension-applying mechanism among each tension member portion, to substantially equalize the pull-down force automatically with respect to the four securement devices.

The pulleys 60 each have a rotational axis 88. Each axis 88 is perpendicular to the parallel rods 68. Each axis 88 is thus selectively movable with respect to the vehicle support assembly 16b in unison with a carriage 66 along a direction substantially perpendicular to the axis 88, in response to adjustment of the pull-down force by the tension-applying mechanism. This operates as a tension member storage assembly to variably store a length of the tension member 48 in response to adjustment of the tension in the tension member. Such a storage system is highly preferable to a winding drum or winch which would cause deformation and wear of the tension member 48 through repeated windings.

The tie-down apparatus used for the upper vehicle support assemblies, such as 16b, includes a row of fasteners 92 mounted on the vehicle support assembly 16b at different longitudinally-spaced positions adjacent each of the opposite sides 44a, 44b. The fasteners 92 are preferably idler rollers, each detachably engageable with the tension member 48. In FIG. 2, the tension member 48 rides along the top of the fasteners 92. The tension member may be selectively engaged with any two fasteners, such as 92a and 92b, by being placed under the two adjacent fasteners illustrated in side view in FIG. 3. The tension member 48 may be thus engaged with any selected adjacent ones of the longitudinally-spaced fasteners 92 so that the tension member may exert its pull-down force on its securement device at a longitudinal inclination with respect to the vehicle support assembly. This enables both tension member portions interconnected with a pair of longitudinally-spaced securement devices to exert their pull-down forces at respective opposing longitudinal inclinations, as exemplified by FIG. 5, regardless of changes in longitudinal spacings of the respective securement devices necessitated by different vehicle lengths. In tie-down apparatus 40 each tension member portion interconnected with each respective pair of longitudinally-spaced securement devices is preferably selectively engageable with the fasteners 92 at different longitudinally-spaced positions. If desired, the tension member portions connected to securement devices 46b and 46c can be moved from engagement with roller fasteners 94 to engagement with fasteners 92.

By engaging the tension member 48 with selected fasteners 92 to achieve longitudinally opposed, inclined pull-down forces, the vehicle may be longitudinally secured so that it will not move longitudinally in response to braking or acceleration of the vehicle transporter despite the absence of wheel chocks. The tension member portions can be attached to the securement devices and the fasteners 92 to provide opposing longitudinal inclinations of each pull-down force either toward the center of the vehicle support assembly, as illustrated by FIG. 5, or away from the center of the vehicle support assembly.

Figure 7:
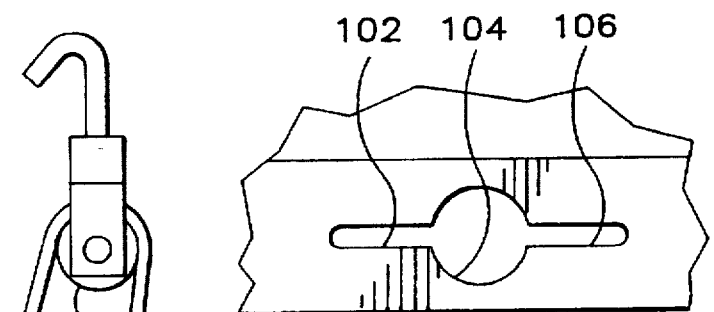
FIG. 7 is a detail view taken along line 7—7 of FIG. 6.
Figure 6:
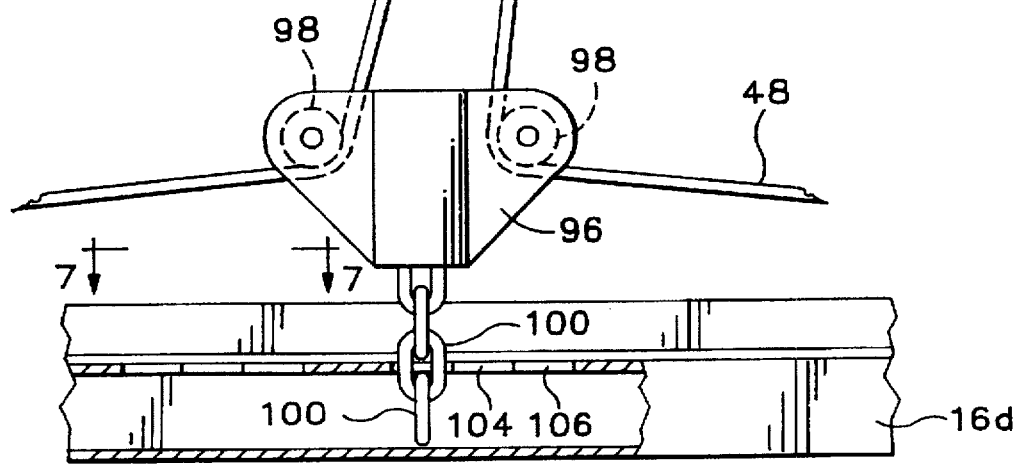
FIG. 6 is a detail view of a portion of an alternative tie-down apparatus.

FIG. 6 shows an alternative movable fastener 96 which is used with the lower vehicle support assemblies, such as vehicle support assembly 16d in FIG. 1. This type of movable fastener 96 is preferred where it would be difficult to access fixed fasteners 92 from beneath the vehicle support assembly. The movable fastener 96 has two pulleys 98 which engage the tension member 48. Attached to the bottom of the movable fastener 96 are chain links 100. The vehicle support assembly 16d has a row of longitudinally-spaced keyholes 102 (FIG. 7) on each opposite side. The chain links 100 fit into the center hole 104 of the keyhole 102. At least one chain link 100 is then placed below the narrow slot 106 to prevent the movable fastener 96 from moving with respect to the vehicle support assembly. The securement device is attached to the vehicle and a keyhole 102 is selected so that the longitudinal inclination of the pull-down force pulls the chain link away from the center hole 104.

In tie-down apparatus 40 the tension member portions 50 are each connected to form a single tension member, which is a unitary cable. Alternative arrangements of tension members and tension-applying mechanisms are possible within the scope of the present invention. These alternative arrangements may be used when the vehicle support ramps are not flat, or when other structures prevent the use of a single cable.

Figure 8:
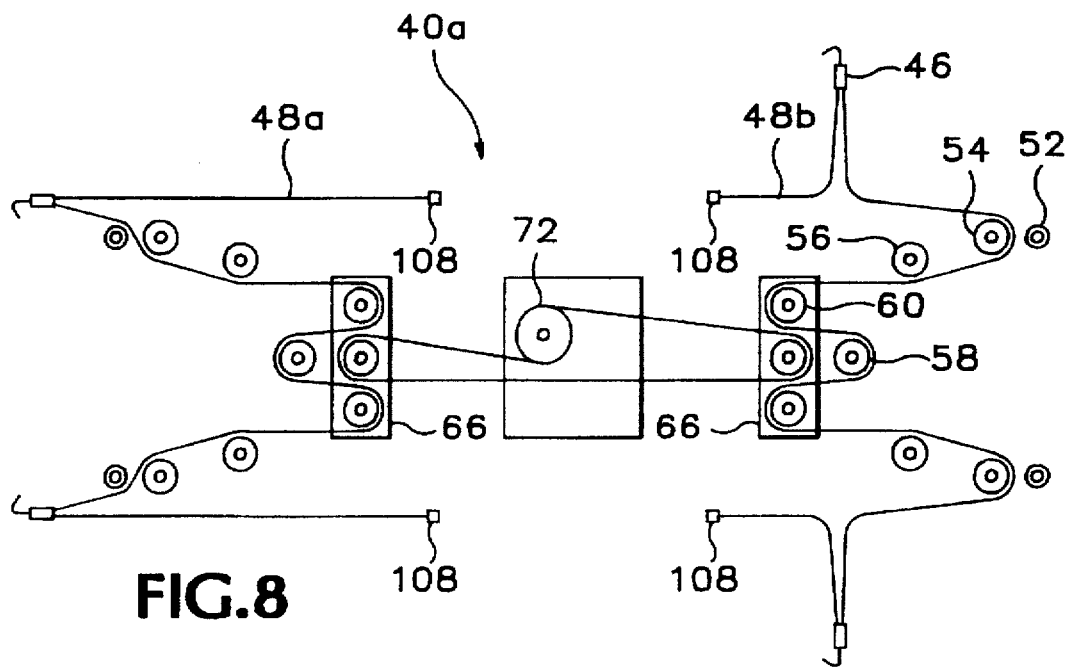
FIG. 8 is a schematic view of a further alternative tie-down apparatus in accordance with the present invention.

For example, FIG. 8 shows a schematic of one possible alternative. In that alternative, the tie-down apparatus 40a has two tension members 48a and 48b. The ends of each tension member are attached to the vehicle support assembly at securement points 108.

Figure 9:
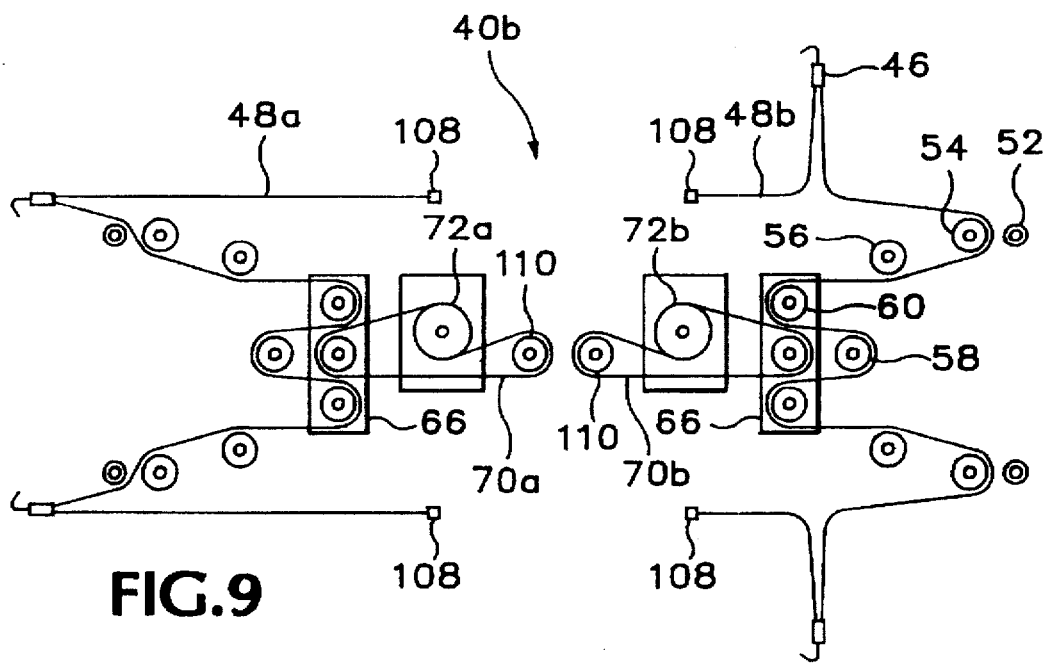
FIG. 9 is a schematic view of a further alternative tie-down apparatus in accordance with the present invention.

In another alternative shown in schematic view in FIG. 9, the tie-down apparatus 40b has two sets of dual hubs 72a and 72b. The tie-down apparatus has two additional pulleys 110, fixed to the vehicle support assembly, about which cables 70a and 70b are wrapped. Each set of hubs 72a, 72b may be rotated independently of the other set of hubs. This is useful for applications involving lengthy tension members where large amounts of slack must be taken up in the tension member to secure the vehicle. Despite the fact that a single set of hubs does not interconnect the two carriages 66, the embodiment of FIG. 9 is nevertheless able to equalize the pull-down forces automatically on all four securement devices because the longitudinally-spaced pairs of securement devices pull longitudinally against each other through the vehicle, due to their opposing inclinations. Thus, rotation of either set of hubs 72a or 72b can equalize all four pull-down forces.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for securing a vehicle to a longitudinally-extending elongate vehicle transporter, comprising:
   (a) placing a vehicle on a longitudinally-extending vehicle support assembly having transversely-spaced opposite sides;
   (b) attaching at least a respective pair of longitudinally-spaced securement devices to said vehicle adjacent each of said sides;
   (c) interconnecting a respective flexible tension member portion with each of said securement devices, each said tension member portion capable of exerting a pull-down force on a respective one of said securement devices;
   (d) interconnecting a tension-applying mechanism to each said tension member portion, said tension-applying mechanism capable of automatically simultaneously distributing tension applied by said tension-applying mechanism among each said tension member portion;
   (e) engaging at least one respective said flexible tension member portion with said vehicle support assembly adjacent each of said sides at selected ones of different alternative longitudinally-spaced positions and exerting a resultant pull-down force on each of said securement devices through a respective said flexible tension member portion, including selecting said selected ones of said different alternative longitudinally-spaced positions adjacent said sides so that each resultant pull-down force exerted on a respective one of said pair of longitudinally-spaced securement devices has a longitudinal inclination opposing said resultant pull-down force exerted on another of said pair of longitudinally-spaced securement devices; and (f) simultaneously adjusting each said respective pull-down force on each of said securement devices to secure said vehicle to said vehicle support assembly.

2. The method of claim 1, wherein step (e) includes the step of engaging said respective flexible tension member portion with a respective fastener mounted on said vehicle support assembly at a selected one of said different alternative longitudinally-spaced positions.

3. The method of claim 1, wherein step (e) includes the step of engaging said respective flexible tension member portion with a fastener selectively engageable at different alternative longitudinally-spaced positions on said vehicle support assembly, and engaging said fastener with said vehicle support assembly at a selected one of said different alternative longitudinally-spaced positions.

4. The method of claim 1 wherein step (f) includes adjusting each said pull-down force to be substantially equal to each other.

5. The method of claim 1, wherein step (e) includes exerting said pull-down force through at least two side-by-side parts of each said tension member portion.

6. The method of claim 1, further including automatically limiting each said pull-down force to a predetermined amount.

7. A method for securing a vehicle to a longitudinally-extending elongate vehicle transporter, comprising:

(a) placing a vehicle on a longitudinally-extending vehicle support assembly having transversely-spaced opposite sides;

(b) attaching at least a respective pair of longitudinally-spaced securement devices to said vehicle adjacent each of said sides;

(c) interconnecting a respective flexible tension member portion with each of said securement devices, each said tension member portion capable of exerting a pull-down force on a respective one of said securement devices;

(d) interconnecting a tension-applying mechanism to each said tension member portion, said tension-applying mechanism capable of automatically simultaneously distributing tension applied by said tension-applying mechanism among each said tension member portion;

(e) engaging at least one respective said flexible tension member portion with said vehicle support assembly adjacent each of said sides at selected ones of different longitudinally-spaced positions and simultaneously exerting a respective pull-down force on each of said securement devices through a respective flexible tension member portion while simultaneously adjusting each said pull-down force to be substantially equal to each other regardless of which ones of said different longitudinally-spaced positions have been selected.

8. The method of claim 7, wherein step (e) includes the step of engaging said respective flexible tension member portion with a respective fastener mounted on said vehicle support assembly at a selected one of said different longitudinally-spaced positions.

9. The method of claim 7, wherein step (e) includes the step of engaging said respective flexible tension member portion with a fastener selectively engageable at different longitudinally-spaced positions on said vehicle support assembly, and engaging said fastener with said vehicle support assembly at a selected one of said different longitudinally-spaced positions.

10. The method of claim 7, wherein step (e) includes exerting said pull-down force through at least two side-by-side parts of each said tension member portion.

11. The method of claim 7, further including automatically limiting each said pull-down force to a predetermined amount.

12. The method of claim 7, wherein step (e) includes selecting said selected ones of said different longitudinally-spaced positions adjacent said sides so that each said pull-down force exerted on a respective one of said pair of longitudinally-spaced securement devices has a longitudinal inclination opposing said pull-down force exerted on another of said pair of longitudinally-spaced securement devices.

13. A method for securing a vehicle to a longitudinally-extending elongate vehicle transporter, comprising:

(a) placing a vehicle on a longitudinally-extending vehicle support assembly having transversely-spaced opposite sides;

(b) attaching at least a respective pair of longitudinally-spaced securement devices to said vehicle adjacent each of said sides;

(c) interconnecting a respective flexible tension member portion with each of said securement devices;

(d) exerting a respective pull-down force on each of said securement devices through a respective said flexible tension member portion; and (e) automatically limiting each said pull-down force to a predetermined amount while concurrently exerting each said respective pull-down force.

14. The method of claim 13, wherein step (d) includes simultaneously adjusting each said respective pull-down force to be substantially equal to each other.

15. The method of claim 13, further including engaging at least one respective said flexible tension member portion with said vehicle support assembly adjacent each of said sides at selected ones of different longitudinally-spaced positions, and selecting said selected ones of said different longitudinally-spaced positions adjacent said sides so that each said pull-down force exerted on a respective one of said pair of longitudinally-spaced securement devices has a longitudinal inclination opposing said pull-down force exerted on another of said pair of longitudinally-spaced securement devices.

16. A method for securing a vehicle to a longitudinally-extending elongate vehicle transporter, comprising:

(a) placing a vehicle on a longitudinally-extending vehicle support assembly having transversely-spaced opposite sides;

(b) attaching at least a respective pair of longitudinally-spaced securement devices to said vehicle adjacent each of said sides;

(c) interconnecting a respective flexible tension member portion with each of said securement devices;

(d) exerting a respective pull-down force on each of said securement devices by exerting a tension force in each of at least two side-by-side parts of a respective said flexible tension member portion so that each said respective pull-down force exceeds said tension force in each of said side-by-side parts.

17. The method of claim 16, wherein step (d) includes simultaneously adjusting each said respective pull-down force to be substantially equal to each other.

18. The method of claim 16, wherein step (c) includes engaging at least one respective said flexible tension member portion with said vehicle support assembly adjacent each of said sides at selected ones of different longitudinally-spaced positions, and selecting said selected ones of said different longitudinally-spaced positions adjacent said sides so that each said pull-down force exerted on a respective one of said pair of longitudinally-spaced securement devices has a longitudinal inclination opposing said pull-down force exerted on another of said pair of longitudinally-spaced securement devices.

* * * * *